Figure 11:
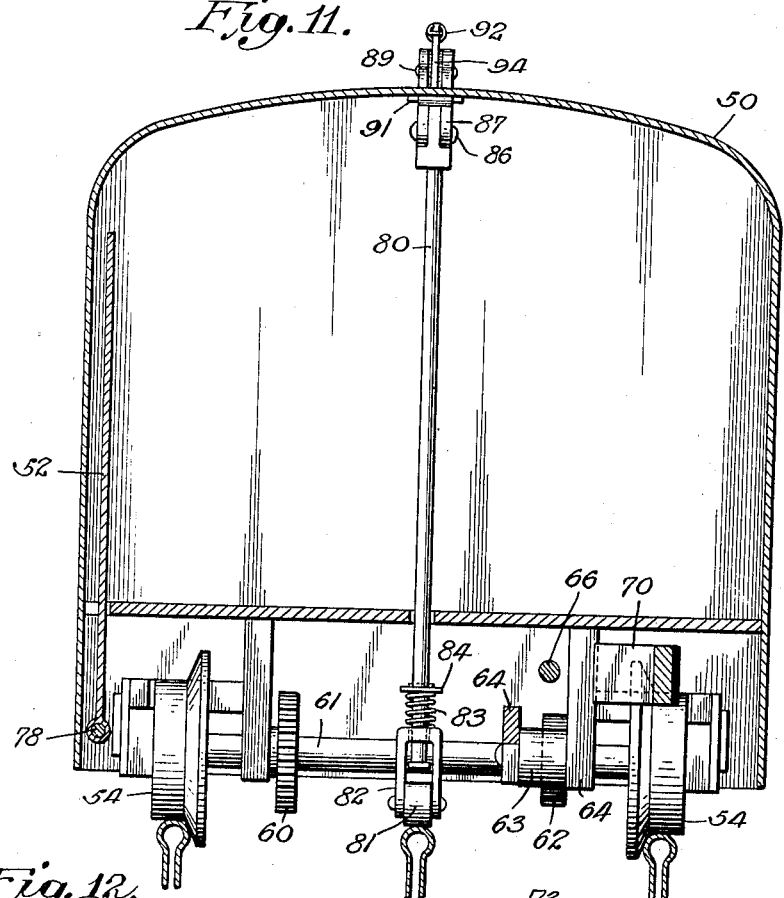

April 27, 1943. G. H. M. DAHL 2,317,363
TOY ELECTRIC CAR
Filed Oct. 5, 1939 10 Sheets-Sheet 1
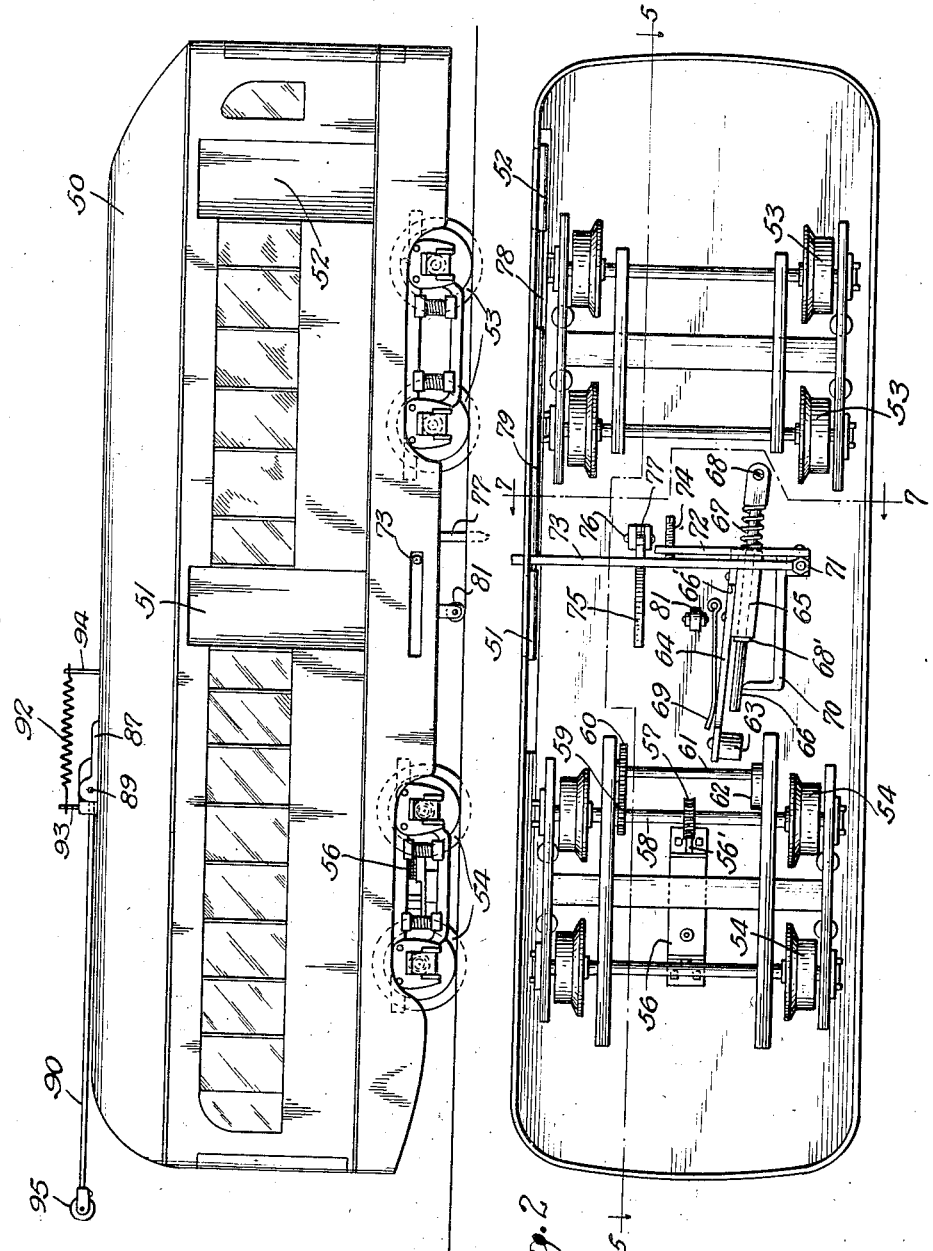
Inventor
George H. M. Dahl,

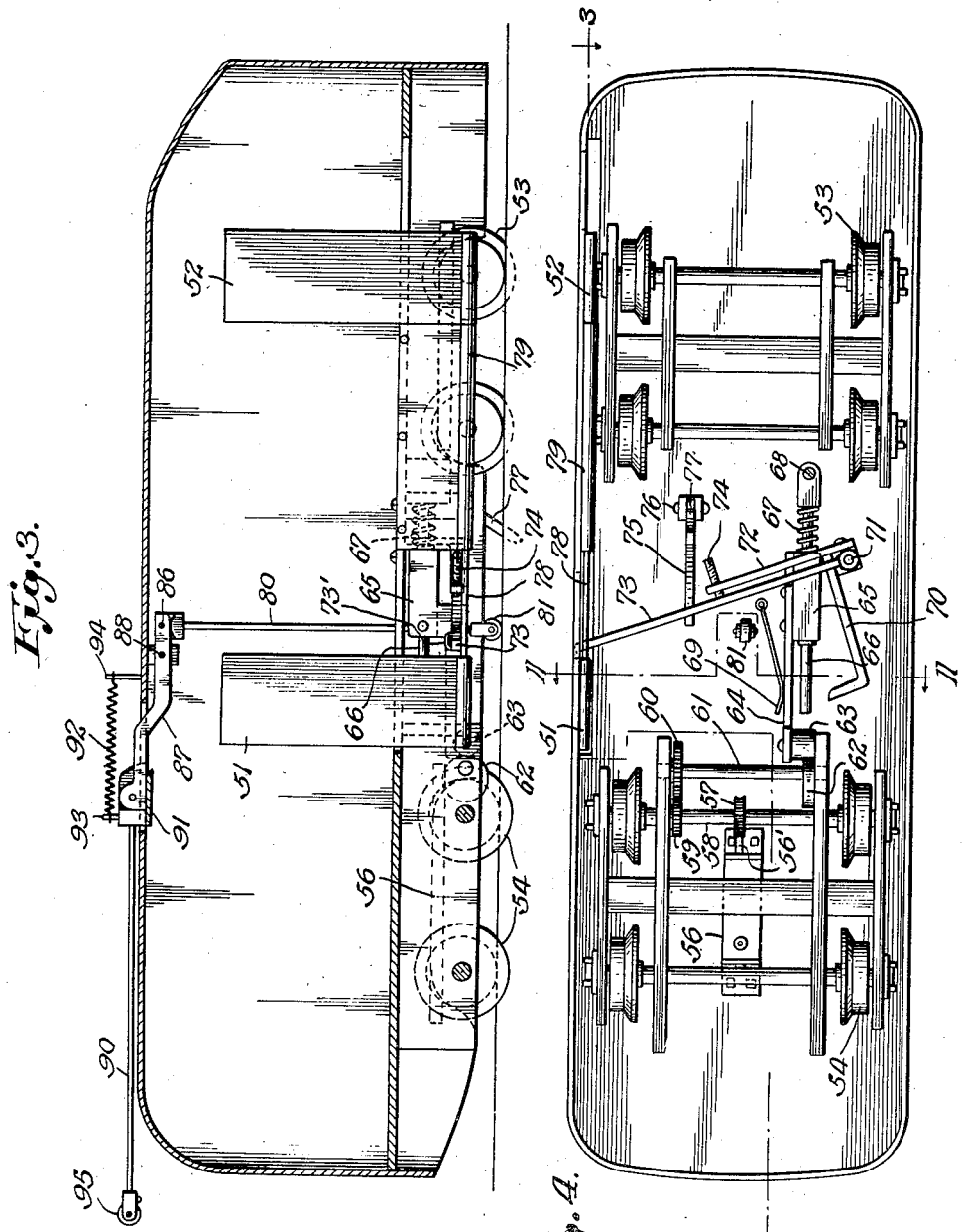

April 27, 1943. G. H. M. DAHL 2,317,363
TOY ELECTRIC CAR
Filed Oct. 5, 1939 10 Sheets-Sheet 3
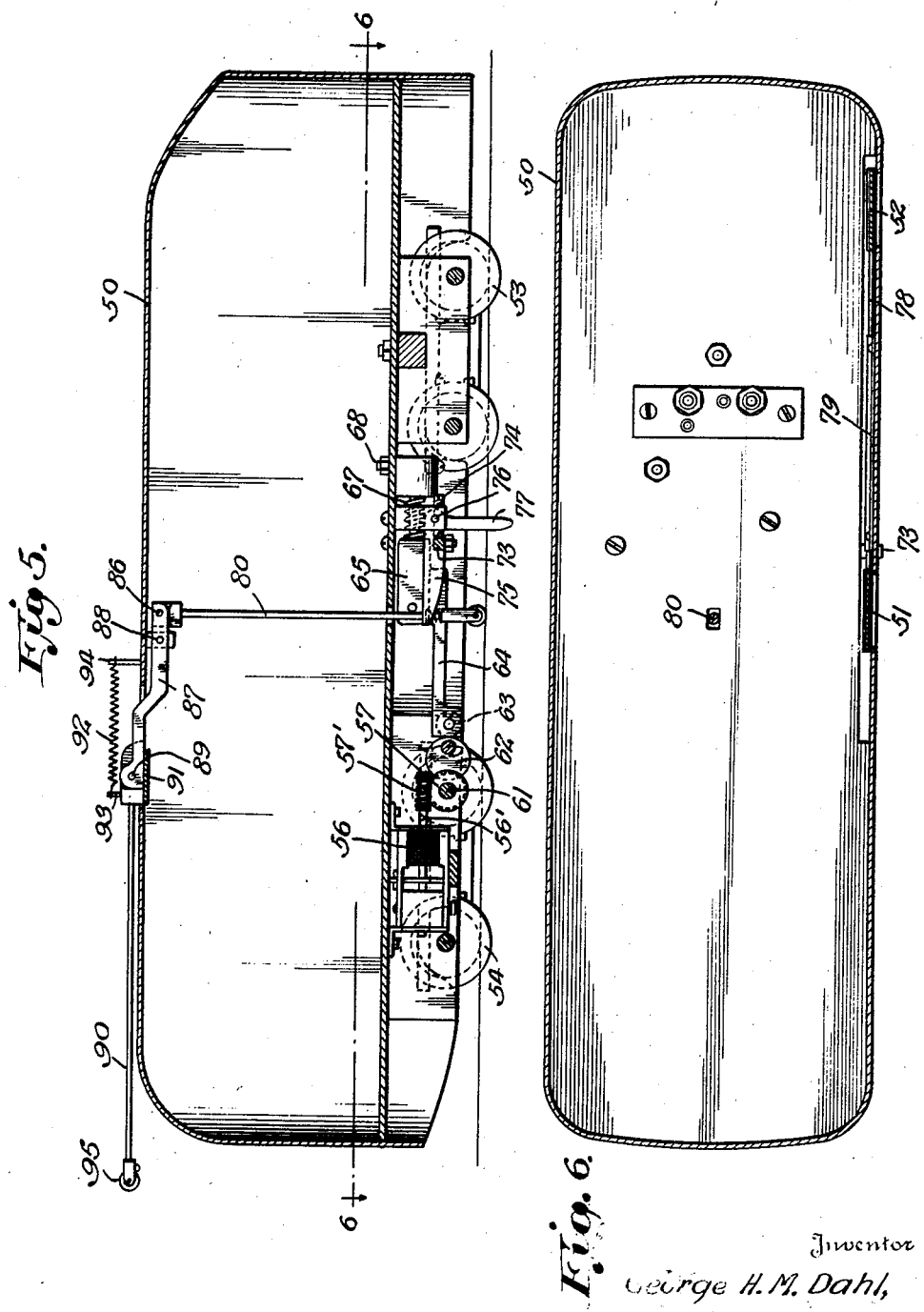
Inventor
George H. M. Dahl,
Attorney April 27, 1943.   G. H. M. DAHL   2,317,363
TOY ELECTRIC CAR
Filed Oct. 5, 1939   10 Sheets-Sheet 4
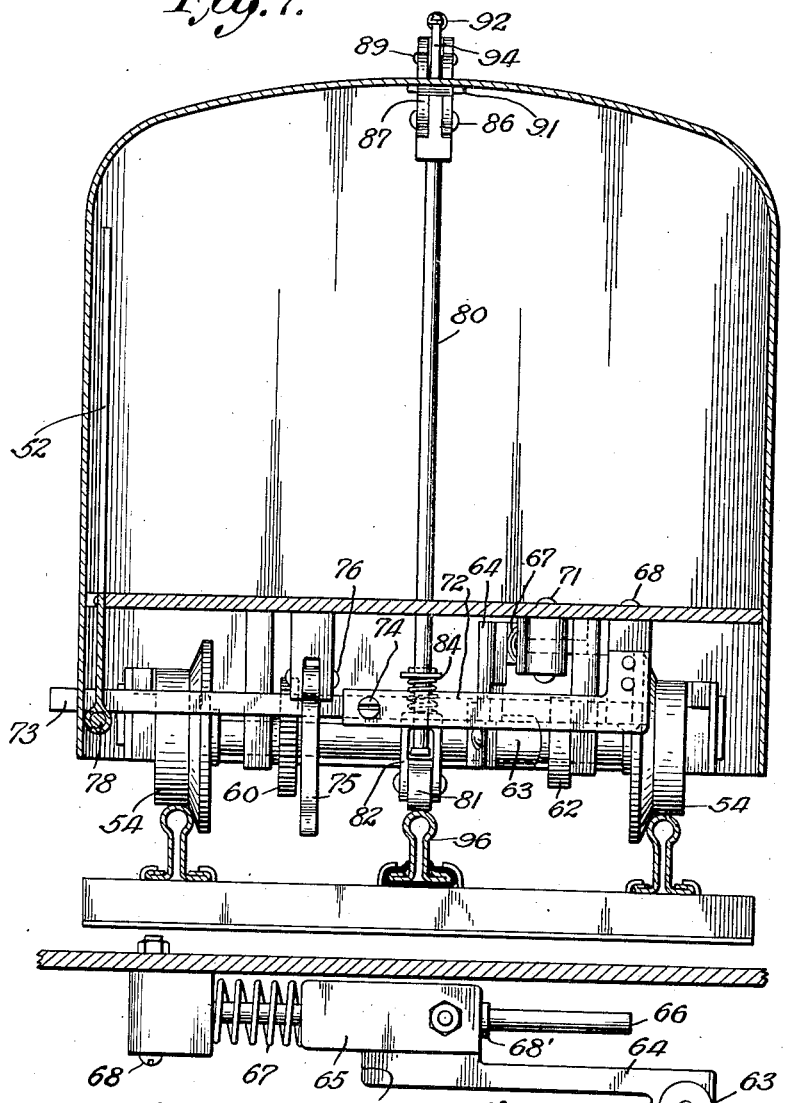
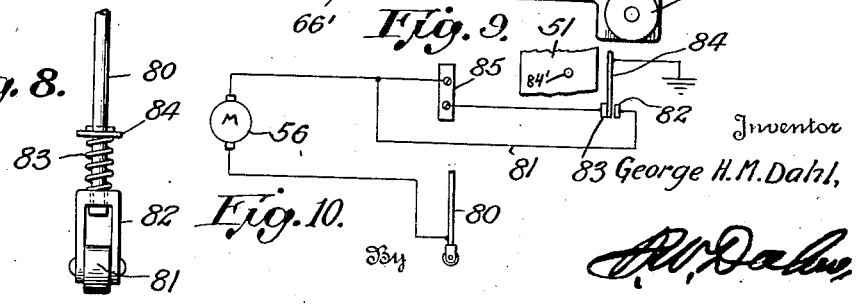
Inventor
George H. M. Dahl,
Attorney April 27, 1943.  G. H. M. DAHL  2,317,363
TOY ELECTRIC CAR
Filed Oct. 5, 1939  10 Sheets-Sheet 5

Inventor
George H. M. Dahl,

April 27, 1943.   G. H. M. DAHL   2,317,363
TOY ELECTRIC CAR
Filed Oct. 5, 1939   10 Sheets-Sheet 6

Inventor
George H. M. Dahl,
By
Attorney

April 27, 1943.  G. H. M. DAHL  2,317,363
TOY ELECTRIC CAR
Filed Oct. 5, 1939  10 Sheets-Sheet 7
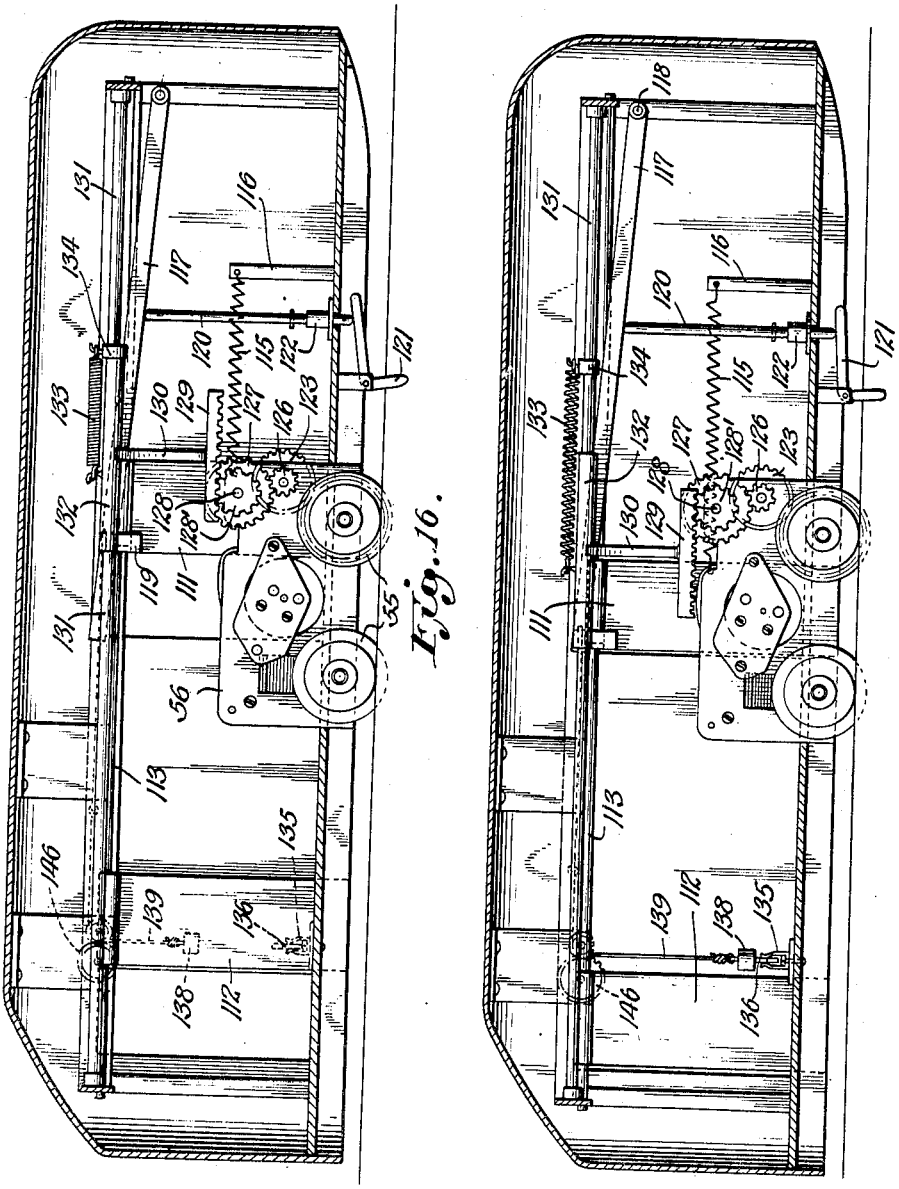
Inventor
George H. M. Dahl,
By
Attorney April 27, 1943. G. H. M. DAHL 2,317,363
TOY ELECTRIC CAR
Filed Oct. 5, 1939 10 Sheets-Sheet 8

Inventor
George H. M. Dahl,
By
[signature]
Attorney

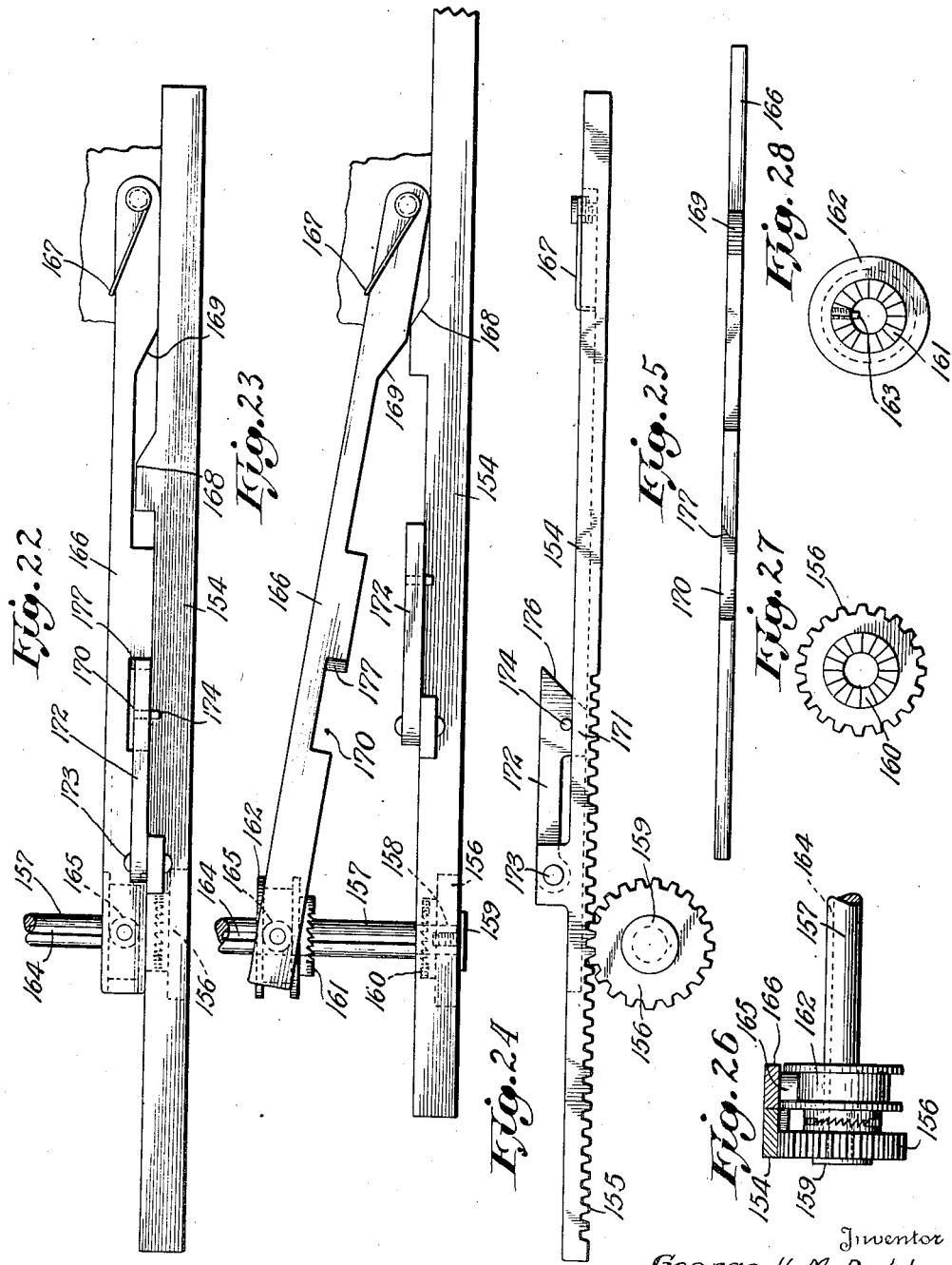

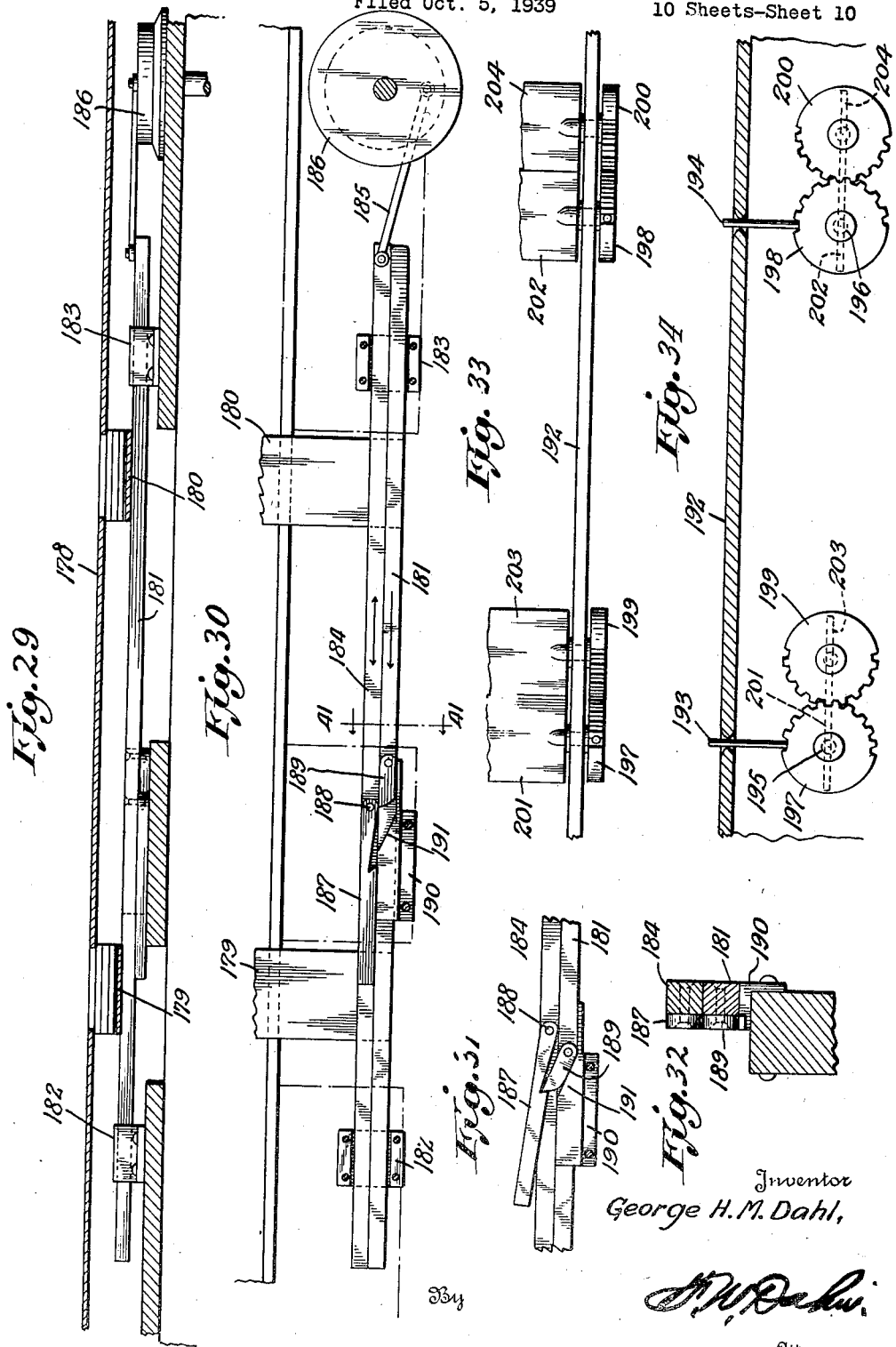

Patented Apr. 27, 1943

2,317,363

UNITED STATES PATENT OFFICE 2,317,363

TOY ELECTRIC CAR

George H. M. Dahl, Washington, D. C.

Application October 5, 1939, Serial No. 298,104

20 Claims. (Cl. 105—341)

My invention relates to a toy electric street railway car, commonly known as a trolley car, and it is an object of the same to provide a car of this type with improved means for opening and closing its door or doors. In one form of the invention such means is completely automatic and is so arranged that the door will not start to open until after the car stops and will begin to close at about the time the car starts to move, but I also contemplate using controlling means that are manually settable for both opening and closing the door or doors.

Another object of the invention is to provide means for opening the door or doors completely at a single full stroke.

Another object of the invention is to provide improved electrical means for opening and closing such a door.

Another object is to provide a car with means for stopping a car when its door is opened, and for subsequently restarting the car and closing the door without the intervention of the operator.

Another object of the invention is to provide improved means whereby the driving means for the car will change automatically from an overhead system to an underneath system and vice versa, with means to insure that the trolley will engage its wire with safety and certainty.

Another object of the invention is to provide trolley controlling means, particularly adapted for use in a system of the kind just referred to, in which the trolley will be moved through a wide arc by a small movement of its controlling means, and will be securely held against rattling or chattering when in its inoperative position.

Other objects and advantages of my invention will appear from the following description and from the annexed drawings which are made a part of the application and in which similar reference characters indicate similar parts.

Figure 12:
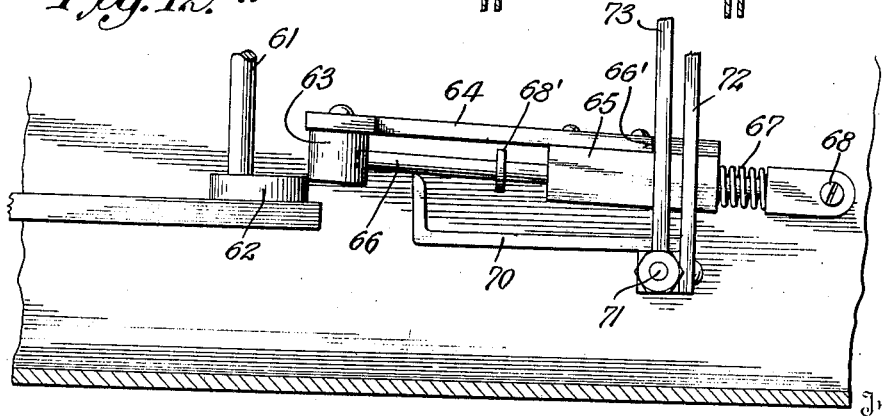
Figure 13:
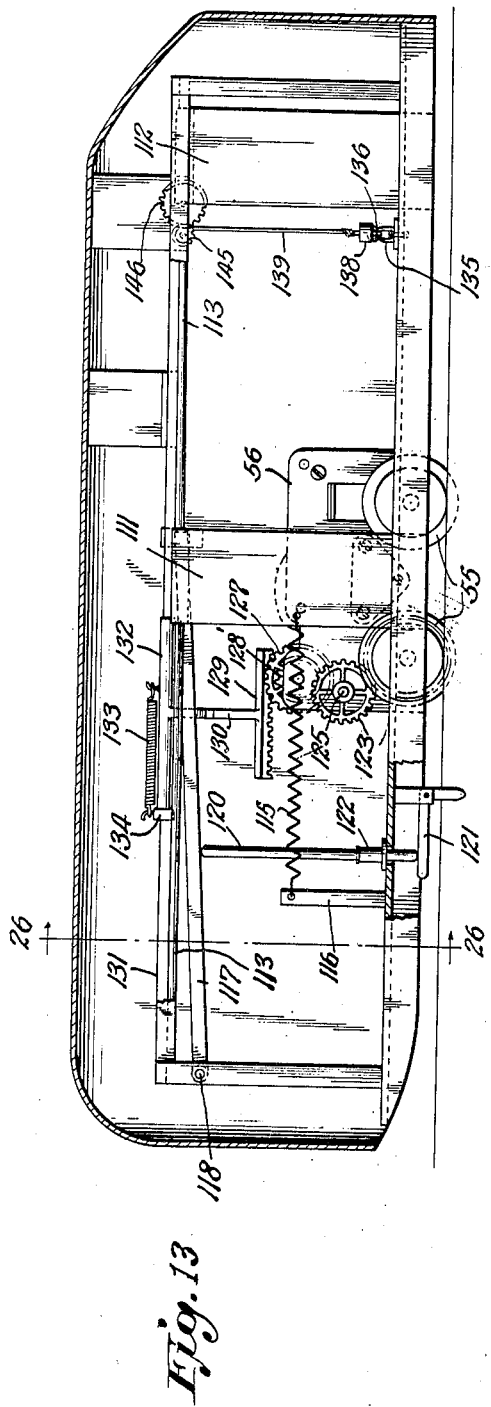
Figure 14:
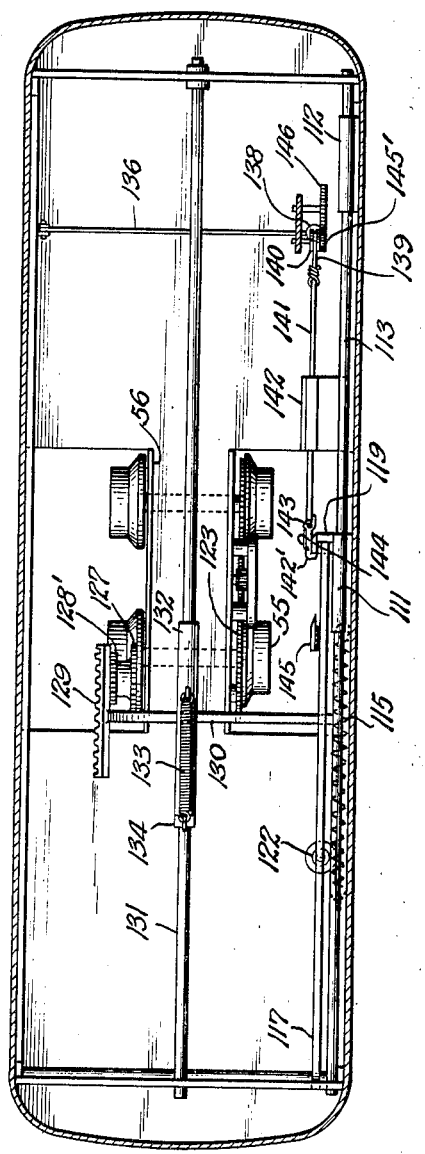
Figure 17:
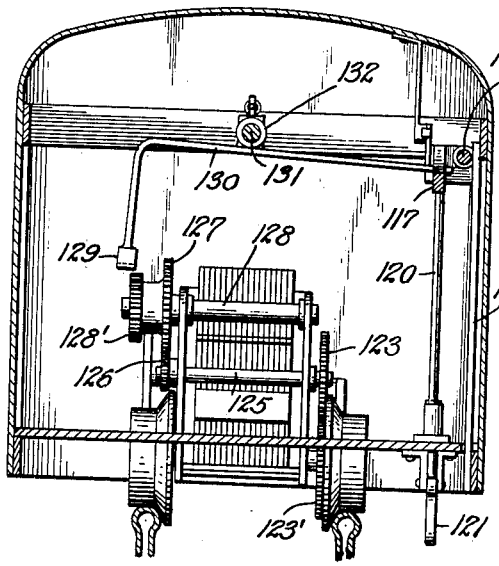
Figure 21:
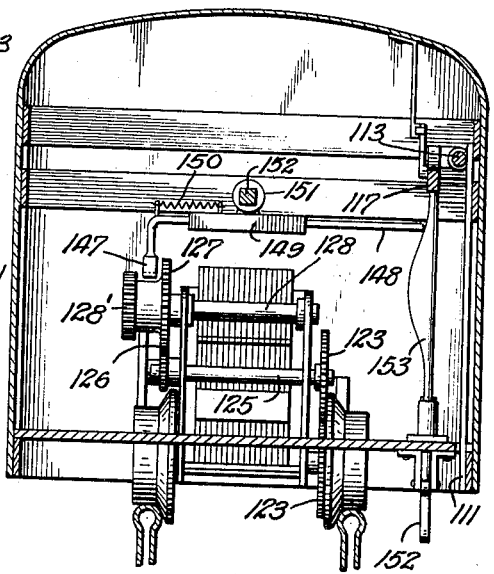
Figure 18:
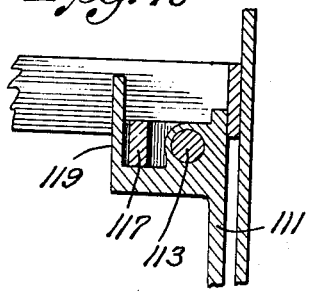
Figure 19:
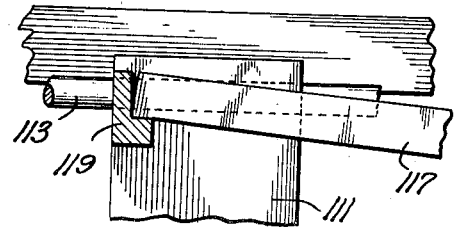
Figure 20:
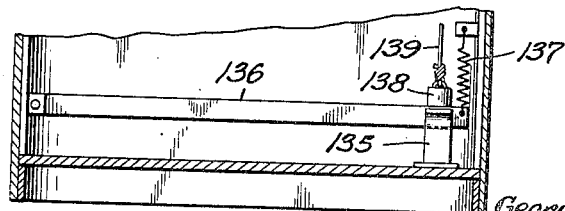

Referring to the drawings:

Fig. 1 is an elevation of a street car embodying features of my invention,

Fig. 2, a bottom plan of the same, illustrating the running gear and the door operating means, Fig. 3, a vertical section on line 3—3 of Fig. 4, Fig. 4, a bottom plan similar to Fig. 2, but showing certain parts in a different position, Fig. 5, a vertical section on line 5—5 of Fig. 2, Fig. 6, a horizontal section on line 6—6 of Fig. 5, Fig. 7, a vertical section on line 7—7 of Fig. 2, Fig. 8, a detail of certain parts shown in Fig. 7, Fig. 9, a detail of parts shown in Fig. 4, looking downward from the top of the figure, Fig. 10, a wiring diagram, Fig. 11, a vertical section on line 11—11 of Fig. 4, Fig. 12, a detail of parts shown in Figs. 2 and 4, but in a different position thereof, Fig. 13, a longitudinal section of a street car with modified door operating means, Fig. 14, a top plan of the same, Fig. 15, a section similar to Fig. 13, looking at the opposite side of the door operating means and showing the doors fully opened, Fig. 16, a view similar to Fig. 15, showing the doors fully closed, Fig. 17, a vertical section on line 26—26 of Fig. 13, Fig. 18, an enlarged detail of parts shown in Fig. 17, Fig. 19, a detail of parts shown in Fig. 15, Fig. 20, a rear elevation of parts shown in Fig. 21, Fig. 21, a similar view showing another modification, differing slightly from that of Fig. 17, Fig. 22, a plan of the essential portions of another modified form of door operating means, Fig. 23, a similar view with parts in a different position, Fig. 24, a side elevation of the same, Fig. 25, a bottom plan of a bar shown in Fig. 23, Figs. 26 to 28, details of parts shown in Fig. 23, Fig. 29, a horizontal section of one side of a street car, showing another modified form of door operating means, Fig. 30, a side elevation of the same, Fig. 31, a detail showing parts in a different position, Fig. 32, a section on line 41—41 of Fig. 30, Fig. 33, a side elevation of means for operating swinging doors in accordance with my invention, Fig. 34, a plan of parts shown in Fig. 33, partly in section.

In the drawings reference character 50 indicates a toy street car generally, the same being provided with doors 51 and 52, front wheels 53, rear wheels 54 (or in some cases, as in Fig. 22, with a single set of wheels 55), and a motor 56 (Fig. 22) geared to the wheels in any conventional manner for driving the same. The driving means for the street car is here shown as including a worm wheel 57 driven by a worm 57' on a shaft 56' driven by the motor 56, said worm wheel 57 being fixed to a shaft 58, here shown as the axle of one of the rear pairs of wheels. This shaft also carries a pinion 59 engaging a gear 60 on a shaft 61, said shaft at its other end being provided with a cam 62.

The cam 62 is adapted to act on a follower 63 attached to a bar 64 mounted on a block 65 for reciprocation on a rod 66. The rod 66 has a vertical shoulder at 66' (Figs. 2 and 12) and the block 65 is spring pressed toward the rear of the car by a coil spring 67 on said rod, the spring bearing at its forward end against a shoulder on a squared portion of the rod. Rod 66 is pivoted at 68, so that the parts just described can swing to and fro so as to occupy the various positions shown in Figs. 1, 3, 7 and 12. The rearward movement of the block 65 is limited by a collar 68' on rod 66 (Fig. 12). Both the cam 62 and its follower are tapered for easy engagement.

A leaf spring 69 is mounted on a fixed part of the car and serves to move the bar 64 and connected parts toward the position shown in Fig. 4. It will be evident that unless the cam 62 is in such a position as indicated in Figs. 2 and 4 the follower 63 will strike against it and cannot move into the position shown in Fig. 4 until after the cam has rotated sufficiently to get out of the way of the follower. For moving the follower out of engagement with cam 62 I provide means comprising a bent rock arm 70 mounted on a pivot 71 and rigidly secured to a rock arm 72. A rock arm 73 is loosely mounted on said pivot and is adjustably positioned with reference to rock arm 72 by means of a screw 74. A detent for the rock arm 73 has a rearwardly projecting arm 75 forming a hook for engaging said rock arm, the detent being pivoted at 76 and having a downwardly extending arm 77 for engagement with abutments suitably positioned between the tracks on which the car runs. The outer end of the arm 73 is connected to the doors 51 and 52 by a yoke 73' shown in Fig. 3. These doors are connected to one another by a rod 78 slidably mounted in a fixed sleeve 79 so that they move simultaneously.

Starting with the doors in the closed position, as in Fig. 2, let it be assumed that the arm 77 strikes an abutment between the tracks. The catch 75 will then be released from arm 73 and the door will be opened at a single stroke by a spring or weight. At the same time the current will be cut off the motor, as explained below, so as to stop the car. The position of the door operating parts will now be as in Fig. 4 except that if the cam 62 is not in the position there shown the abutment 63 will strike against it and will prevent the connected parts from making their full movement until after the cam has been rotated sufficiently to permit the follower to make its full stroke and rest against the adjacent frame member. Rotation of the cam 62 will now force the follower toward the front of the car, moving the block 65 and oscillating the connected rock arms 70, 72, etc., by the action of the shoulder 66' on rod 66 to close the doors as the car starts, the movement of bent arm 70 also forcing the follower off the cam after it has moved far enough so that the catch 75 will engage the arm 73 to prevent reopening of the doors, the parts now again assuming the position of Fig. 2.

The means for temporarily interrupting the current to the motor are shown in Fig. 10 where a circuit is shown as going from a vertical rod 80, which is connected to the trolley, hereinafter described, thence to the motor 56 and through a conductor 81 to a circuit closer comprising spaced apart fixed members 82—83 and a flexible member 84, said parts 82, 83 and 84 being secured to any convenient part of the car, and thence to ground, there being a shunt circuit through a blinker 85 or delayed action thermal switch, such as those in common use for re-closing a circuit with a delayed action, as in the patent to Abbott, No. 2,268,522. The movable member 84 is normally in contact with switch 83 and is adapted to be bent by a lug 84' on the door as the door is being opened so as to break the main circuit to the motor after which the circuit is closed through usual operation of the blinker 85 to start the car. When the car starts the cam 62 acts on follower 63 to move the connected parts from the position of Fig. 4 to that of Fig. 2, the catch 75 now holding the door closed and the bent rod 70 pushing the follower 63 away from its cam.

In the form of the invention shown in Figs. 13 to 17 and 18 to 21 the doors 111 and 112 are connected in any suitable manner for sliding movement on a rod 113 and are moved toward open position by means of a spring 115, shown as extended in Figs. 13, 14 and 16, and as contracted in Fig. 15, where the doors are shown as being open. This spring is attached at one end to a fixed lug 116 on the bottom of the car and at the other end to door 111. A detent 117 pivoted at 118 engages a lug 119 (Fig. 19) on the door 111 for holding the doors normally in closed position.

Means for lifting the detent 117 to release the detent and permit spring 115 to open the doors comprises a vertical rod 120 adapted to be actuated by one arm of a trip 121 whose other arm projects downward into the path of abutments located between the tracks. The rod 120 is guided by a sleeve 122 on the floor of the car.

When the trip 121 is operated to release the detent 117 the doors will be opened to their full extent by the contraction of the spring 115, as in Fig. 24.

For again closing the doors I provide means comprising gearing driven from the shaft of motor 56, said gearing including a gear 123 meshing with a gear 123' (Fig. 17) on one of the wheels 55. The gear 123 is fixed to a shaft 125 (Fig. 13) having at its other end a pinion 126 meshing with a gear 127 on a shaft 128, which also has fixed thereon a pinion 128' that engages a rockable and slidable rack 129 fixed to a support in the form of a bent rod 130 pivoted on a guide rod 131 and having its right hand end (in Fig. 17) extending underneath the detent 117. The bent rod 130 is supported on the guide rod 131 by means of a sleeve 132 which sleeve can be moved lengthwise of the rod by means of a spring 133, the movement of the sleeve and its rack being limited by a collar 134 secured to the guide rod 131. This spring normally holds rack 129 in the position of Figs. 13, 14 and 16. The circuit to the motor is broken as in the case of the form of the invention first described by means comprising contacts 135 on a fixed part of the car and a movable contact 136 (Figs. 15 and 20).

The movable contact is moved toward open position by a spring 137 and is adapted to be closed by means of a weight 138 normally connected to door 111 by means comprising a cord or wire 139 trained about a pulley 140 and connected to a slidable rod 141 mounted for reciprocating movement in a guide 142 fixed to the car. The rod 141 is provided at its end next to door 111 with a hook 142' pivoted at 143 and spring pressed by a spring 144 toward the position shown in Fig. 23. A fixed cam 145 is so located as to engage a portion of the hook and force it away from the door as the door nears its fully opened position. A pinion 145' is fixed to the pulley 140 and meshes with a gear 146, the purpose of this gearing being to retard the movement of the weight 138 and connected parts when the hook 142' is released from the door 111. Any suitable form of gearing and/or braking means may be used at this point so long as the friction is sufficient to retard the fall of the weight appropriately so that it will not fall too suddenly or close the circuit too soon, yet will be effective to move the circuit closer 136 against the tension of spring 137.

In the operation of this form of the invention it will be understood that the car moves along its track until the trip 121 strikes an abutment between or adjacent to the rails, whereupon the plunger 120 will be forced upward, releasing detent 117 and permitting the spring 115 to open the doors. As the doors start to open the weight 138 will be raised thereby so as to permit the circuit closer 136 to rise and break the circuit to the motor. As the doors approach their fully open position the hook 142' is moved away from door 111 by cam 145 and the weight 138 starts slowly downward to close the circuit through contacts 136 and 135 and thus to put the motor into operation again. While the doors are closed the detent 117, being in its lowest position, acts on the outer end of the bent lever 130 to hold the rack 129 out of engagement with its pinion as shown in Fig. 17, but when the detent 117 is raised the rack is permitted to rock into engagement with pinion 128'. When the motor circuit is again closed to start the car, rotation of the wheels 55 operates the driving gearing for rack 129 so as to move the rack from the position of Fig. 15 to that of Fig. 16, stretching the spring 133 and moving the doors toward closed position. Fig. 16 shows the device as the doors are almost closed. During this time the detent 117 has ridden on top of the lug 119 but as the door is closed the detent, which is relatively heavy and which may have weight added at its free end, falls into the position shown in Fig. 19 and strikes the right hand end of bent lever 130 (Fig. 17) moving said lever about its pivot 131 and throwing the rack out of engagement with its pinion 128'. The spring 133 being extended at this time and the rack being released from its pinion, the spring will now contract and draw the rack back to the position shown in Fig. 15, i. e., to the extent permitted by collar 134, and the car is now again in straight running position with the doors closed as in Fig. 22.

In the device of Fig. 21 the parts are generally similar to those shown in Figs. 15 to 17 and are similarly marked with the exception of the rack 147 which has its bent arm 148 mounted to slide in a sleeve 149, the bent arm and the rack being normally drawn to the right in Fig. 21 into the inactive position there shown, as by means of a spring 150. The sleeve 149 is held in the position shown in Fig. 21 by means of a sleeve 151 having a square opening fitting on a squared rod 152, the construction and operation of these parts being otherwise similar to that of Figs. 15 to 17. For moving the rack 147 into operative engagement with its pinion the trip 152, which may be identical in structure with trip 121, is moved by an abutment adjacent the track so as to lift a plunger 153 and thus to trip the detent 117. This plunger 153 is provided at its side next to rod 148 with a cam formation such that it moves the rack into engagement with its pinion when the plunger 153 is elevated to permit the door to be opened. The spring 150 again throws the rack out of engagement with its pinion when the plunger 153 is lowered.

In the modified form of the invention shown in Figs. 22 to 28 there is illustrated a bar 154 adapted to be connected to the car doors (not shown). The bar is provided on its underside with rack teeth indicated at 155, which teeth are in engagement with the teeth of a pinion 156 loosely mounted on a reduced portion at the end of a shaft 157, the pinion 156 being held in place by means of a screw having a threaded portion 158 engaging a threaded hole in the end of the shaft said screw also having a head 159 bearing at its inner side against the outer face of the pinion. At its inner side the pinion, which also serves as a clutch member is provided with clutch teeth 160 for engagement with clutch teeth 161 on a clutch member 162 provided with a spline 163 engaging a slot at 164 in shaft 157.

The clutch member 162 is provided with a circumferential slot to receive a follower 165 on a lever 166 which acts as a clutch shipper and which is acted on by a spring 167 to move the lever in a direction to engage clutch members 162 and 156. The bar 154 is provided with a cam 168 arranged to coact with a cam surface at 169 on the lever 166 and there is a notch at 170 on lever 166 into which the tapered portion 171 of a rocker 172 may fall when the relative position of parts is such as in Fig. 24. A rocker 172 is pivoted at 173 on bar 154 and has a finger 174 arranged to extend over the adjacent part of bar 154 to limit downward movement of the rocker, as shown in Fig. 24. The rocker 172 has an inclined face at 176 to coact with a similarly inclined face at 177 on bar 166.

In the operation of this form of my invention the bar 154 is secured to the door or doors of the car and the shaft 157 is connected to the running gear of a car by any suitable gearing so that shaft 157 is constantly rotated in a clockwise direction when the car is in motion, the door being held in closed position by means such as the detent 117 (Figs. 15 and 19) and being moved toward open position when released by means such as the spring 115 of said figures. When now the door is released and is opened by its spring or by a weight or other suitable means the parts shown are in the running position of Fig. 32 and the bar 154 moves to the left with the door. As these parts move the cam 168 rides out from under the adjacent part of lever 166, permitting the spring 167 to swing lever 166 toward the position of Fig. 22. At this time, however, the rocker 172 is in its lowered position so that the side face of that part of lever 166 which lies immediately to the right of the cam face at 170 in Fig. 23 will contact with the side face of the lower part of the rocker and so prevent the clutch from being thrown in fully until after the rocker has been carried so far to the left that the recess 170 will come opposite the lower part of the rocker and thus permit the clutch members to be completely engaged. The delayed action caused by engagement of the side of the lever 166 with the side of the rocker 172 insures that the doors will be fully opened and also that they will remain open for a short interval. When the clutch member 162, which is constantly rotated by means of its engagement with shaft 157, comes into engagement with clutch member 156 this member is also rotated in a clockwise direction and due to the engagement of its teeth with those of the bar 154 this bar is now moved toward the right in Fig. 24 to close the doors. As the bar 154 moves toward the right the rocker rides up out of the recess at 170 and lever 166 subsequently returns again to the position shown in Fig. 23. In the farther movement of the doors and the bar 154 the cam face at 169 on lever 166 is engaged by cam 168 to throw the lever 166 toward the position of Fig. 23 and to disengage the clutch members after the doors reach a position where they will be locked shut, leaving the doors locked in closed position until the opening means is again operated.

In the modification of Figs. 29 to 32 there is shown a side wall 178 of a toy street car having doors 179 and 180 secured to a rod 181 which is slidably mounted in bearings 182 and 183 on the frame of the car. A constantly moving reciprocatory bar 184 is also mounted in said bearings immediately above the bar 181, the bar 184 being reciprocated by means of the link 185 connecting it to a rotary member 186 which may be one of the wheels supporting the car body or may be geared to one of said wheels. The reciprocating bar is provided with a hook 187 pivoted at 188 and the bar 181 is provided with a pivoted rocker 189 adapted to be elevated into a position where it will be engaged by said hook to move the bar 181 to the right. A bracket 190 fixed to the car frame underneath the bar 181 is provided with a cam face at 191.

In the operation of this modified form of the invention the bar 184 is constantly reciprocated and when the door is moved toward the left into open position, as for example by means such as spring 115 in Fig. 15, the rocker 189 will ride against the cam face 191 on fixed block 190 and will be moved thereby into the position shown in Fig. 31. Upon the next movement of the bar 184 to the right its hook 187 will engage the rocker and close the door, the rocker 189 now being returned to its lowermost position shown in Fig. 30 by gravity and/or due to the fact that the right hand part of the hook is so formed as to force the rocker all the way down so that it cannot be engaged by the hook except upon again being raised into the position of Fig. 31.

Figs. 33 and 34 show how double doors may be operated by such expedients as above described, reference character 192 indicating a bar which is moved lengthwise of the car in one direction to open the doors and in the other direction to close them. This bar engages rock arms 193, 194 respectively mounted to rock about pivots 195, 196. Fixed to the respective rock arms for pivotal movement therewith are gears 197, 198 having segmental sets of gear teeth meshing respectively with similar teeth on similar gears 199 and 200. Connected to the respective members 197 and 198 to oscillate therewith there are doors 201 and 202, while doors 203 and 204 are similarly connected with the members 199 and 200 respectively. Thus it will be seen that there are provided pairs of doors, the doors of each pair being swingable away from one another to open a doorway and toward one another to close it upon operation of the slidable bar 192 by means such as hereinbefore described.

It will be obvious to those skilled in the art that various changes may be made in the devices shown and described in the specification, all without departing from the spirit of the invention, and therefore I do not limit myself to what is so shown and described but only to what is required by the state of the art.

Having thus fully described my invention what I claim is:

1. In a toy electric street car, a sliding door, means for opening said door, a member movable in a direction parallel to the plane of the door to close said door, means for connecting said member to the driving gear of the car for causing said member to be moved thereby, means for normally rendering said connecting means inoperative and means operated during the opening movement of the door for positioning said connecting means to close the door after it has been fully opened.

2. In a toy electric street car, a motor for driving the car, a door, means biased to open said door, means for holding the door closed, a trip for releasing said holding means, said trip being adapted to be actuated by a fixed abutment adjacent the path of travel of said car, and means operated in the opening movement of the door to break the circuit of said motor, a slidable member, a releasable member movable with said slidable element as the door is opened, means for releasing said releasable element as the door approaches its fully opened position, means controlled by said releasable element for re-closing said motor circuit, and retarding means acting on said last-named means for holding the motor circuit open for a predetermined period.

3. In a toy electric street car, a motor for driving the car, a door, means biased to open said door, means for holding the door closed, a trip for releasing said holding means, said trip being adapted to be actuated by a fixed abutment adjacent the path of travel of said car, means operated in the opening movement of the door to break the circuit of said motor, and automatic means for subsequently re-closing said circuit and said door.

4. A toy electric street car comprising a sliding door, a motor for driving the car, means for opening said door, a circuit closer in circuit with said motor including a movable switch member, means operated by said door as it opens for moving said switch member to break the motor circuit, automatic means for re-closing the motor circuit after the stopping of the car, and automatic means for closing said door upon restarting of the car.

5. A toy electric street car comprising a sliding door, a motor for driving the car, means for opening said door, a circuit closer in circuit with said motor including a normally-closed switch member, a shunt circuit including a blinker, means movable with said door as it is opened for moving said member to break said motor circuit and to close a circuit through said blinker so as to restart the car after a predetermined interval, and automatic means for closing the door upon restarting of the car.

6. A toy electric car having wheels for engaging the rails of a railway, a side door for the car, means for securing said door in closed position, a trip operable by a fixed abutment adjacent the railway, said trip being constructed and arranged to release said securing means, a cam operated by a wheel of the car, door closing means operable by said cam including a cam follower movable into and out of engagement with said cam, and means under control of said trip for placing said element in position to be operated by said cam to close said door.

7. A toy electric car having wheels for engaging the rails of a railway, a slidable side door, means for locking said door in closed position, a trip operable by a fixed abutment adjacent the railway, said trip being constructed and arranged to release said locking means, a cam operated by a wheel of the car, door closing means operable by said cam including a cam follower movable into and out of engagement with said cam, means under control of said trip for placing said follower in position to be operated by said cam for closing said door and causing it to be locked in closed position, and means operated by said cam in closing said door for removing said follower from said cam.

8. A toy electric car having wheels for engaging the rails of a railway, a slidable side door for the car, a trip operable by a fixed abutment adjacent the railway, said trip being constructed and arranged to release said securing means, a cam operated by a wheel of the car, door closing means operable by said cam including a cam follower movable into and out of engagement with said cam, means for engaging said door closing means to lock the door in closed position, means under control of said trip for placing said follower in position to be operated by said cam for closing said door, and means operated by said cam in closing said door for disconnecting said follower from said cam, for positioning the door closing means so as to be engaged by the locking means and to lock said follower in idle position out of engagement with said cam.

9. A toy electric street car having a frame, running gear including wheels supporting the frame, a doorway in the frame, a side door for the car, locking means for holding the door closed, means biased to open the door, means for releasing said locking means to permit the door to open, connections between said door and a wheel of the running gear for closing said door, said connections including a cam driven by said wheel, a reciprocatory element operable by said cam but normally out of engagement with said cam, means operated by said lock-releasing means for positioning said reciprocatory element for operation by said cam, and connections from said reciprocating element to said door for closing the same.

10. A toy electric street car having a frame, running gear including wheels supporting the frame, a doorway in the frame, a side door for the car, locking means for holding the door closed, means tending to open the door, means for releasing said locking means to permit the door to open, connections between said door and a wheel of the running gear for closing said door, said connections including a cam driven by said wheel, a reciprocating element operable by said cam but normally out of engagement with said cam, means operated by said lock-releasing means for positioning said reciprocating element for operation by said cam, and connections from said reciprocating element to said door for closing the same, said last named connections also acting to disconnect said reciprocatory element from said cam.

11. In a toy electric car, a door, a rack secured to the door, a normally-stationary pinion engaging said rack, a member arranged for constant rotation when the car is in motion, means for opening said door, and means for connecting said constantly rotating member to said pinion upon the opening of said door, said member rotating in a direction to close said door.

12. In a toy electric street car, a slidable door, means tending to open the door, door-closing means including a lever connected at one end to the door, a detent acting on said lever to hold the door closed, a rod connected to said lever and adapted to be moved lengthwise of the car, a pivotal support for said rod, a cam follower on said rod, a rotary cam constantly driven when the car is in motion, means for releasing said detent when the door is to be opened, means tending to swing said rod and position said follower for operation by said cam when said detent is released, and means for moving said cam follower away from said cam as the door is being closed.

13. In a toy electric street car, a slidable door, a rack movable parallel to the plane of the door and connected thereto, a pinion connected to the car driving means for operating said rack to close the door, and means rendered effective upon opening of the door for connecting the rack to the pinion so as to close the door when the car is started.

14. In a toy electric street car, a slidable door, a rack movable parallel to the plane of the door, a pinion which is rotated constantly while the car is in motion, means operable upon the opening of the door to cause the pinion to drive said rack so as to close the door, and means to interrupt said drive upon the closing of the door.

15. In a toy electric street car, a door slidable lengthwise of the car, a door operating member also movable lengthwise of the car, means for opening the door, a member rotating constantly while the car is in motion, means for connecting said last-named member to said door-operating member upon opening of the door so as to actuate said door operating member to close the door.

16. In a toy electric street car, a slidable door, a clutch member rotating constantly in a direction to close said door when the car is in motion, a normally stationary clutch member, means for automatically engaging said clutch members when the door is opened, and means for automatically disengaging said clutch members when the door is closed.

17. In a toy electric street car, a slidable door, an actuating member therefor reciprocable in a line parallel to the plane of the door, an actuating member for said door constructed for constant movement when the car is in motion, and means arranged to act upon opening of said door to establish operative connection between said constantly movable member and said actuating member for closing the door.

18. A device as in claim 17, including automatic means to disestablish said connection upon the closing of said door.

19. In a toy street car, a slidable door, a pinion constantly driven when the car is in motion, a rack connected to the door to reciprocate therewith, said rack and pinion being normally disengaged, and means for automatically engaging them when the door is opened.

20. In a toy electric car, a motor for driving the car, a door, means biased to open the door, means for holding the door closed, a trip for releasing the said holding means, said trip adapted to be actuated by a fixed abutment adjacent the path of travel of the car, means operated in the opening movement of the door to break the circuit of said motor, said last-mentioned means including a slidable member, means connecting the said slidable member to the door in its opening movement, means for releasing the slidable member from the door as the door approaches its fully opened position, and means for re-closing the motor circuit upon release of said slidable member.

GEORGE H. M. DAHL.